UNITED STATES PATENT OFFICE.

ZACHARIAH G. CRITTENDEN, OF SHADY GROVE, ALABAMA.

PROCESS OF TREATING LUMBER.

1,177,492.

Specification of Letters Patent. Patented Mar. 28, 1916.

No Drawing. Application filed June 4, 1915. Serial No. 32,169.

*To all whom it may concern:*

Be it known that I, ZACHARIAH G. CRITTENDEN, a citizen of the United States, residing at Shady Grove, in the county of Pike and State of Alabama, have invented certain new and useful Improvements in Processes of Treating Lumber; and I do hereby declare the following to be a full, clear, and exact description of the invention, such as will enable others skilled in the art to which it appertains to make and use the same.

This invention relates to processes of treating lumber, and more especially red gum lumber, in which the sap portion is almost valueless, owing to the fact that glue or mold spots on the sap wood gives the appearance of incipient decay to the lumber, and for this reason, it is of very low value, while the heart of red gum lumber is quite valuable.

The principal object of this invention is to give to the appearance of sap lumber, the pink or reddish color of the heart portion of the tree, thus utilizing the valueless sap portion of the tree as well as the heart.

In carrying out the invention, I utilize a steam chest having a series of steam pipes having jet openings therein and in this steam chest I pile the lumber in alternate layers separated one from the other, said layers comprising red gum heart lumber and sap lumber. Steam is then turned on and enters the steam chest through the perforated pipes and the lumber is saturated. The sap lumber will absorb the material exuding from the heart lumber, after remaining in the steam chest a certain length of time, and after the lumber has been removed from the chest and dried, the sap lumber has a similar appearance to the red heart lumber, thus rendering the almost useless sap lumber as valuable or nearly so as the heart lumber.

From the foregoing it will be obvious that this process does not require the use of chemicals, is comparatively inexpensive to carry on, can be performed by unskilled persons, and results in a saving of material which has heretofore been almost worthless.

It is to be understood that if so desired the steam used to treat the lumber may be exhaust steam from an engine or may be the live steam directly from the boiler, according to the desire of the user. It will of course be obvious that the use of the exhaust steam from the engine will effect a considerable saving and render the device economical in operation.

Various changes may be made in the details of the process without departing from the spirit and scope of the invention as defined in the claim.

What is claimed is:—

A process of treating red gum lumber which consists in piling in alternate layers the red heart gum lumber and the sap lumber in a steam chest, said layers being separated, and turning steam into said chest to permit the coloring element of the heart lumber to be absorbed by the sap lumber.

In testimony whereof I affix my signature in presence of two witnesses.

ZACHARIAH G. CRITTENDEN.

Witnesses:
A. W. THOMPSON, Jr.,
W. R. LANCASTER.